United States Patent [19]
Takasaki et al.

[11] Patent Number: 5,744,521
[45] Date of Patent: Apr. 28, 1998

[54] CATHODIC ELECTRODEPOSITION PAINT FORMING FILMS HAVING IMPROVED SURFACE SMOOTHNESS

[75] Inventors: Haruhiko Takasaki, Hirakata; Mitsuo Yamada, Suita, both of Japan

[73] Assignee: Nippon Paint Co., Ltd., Osaka, Japan

[21] Appl. No.: 779,846

[22] Filed: Jan. 7, 1997

[30] Foreign Application Priority Data

Jan. 8, 1996 [JP] Japan ................... 8-018428

[51] Int. Cl.⁶ .................. C08L 63/02; C08L 63/04
[52] U.S. Cl. .......... 523/404; 523/415; 204/501; 204/502; 204/504; 204/505
[58] Field of Search .................. 523/404, 415; 204/501, 502, 504, 505

[56] References Cited

U.S. PATENT DOCUMENTS

| | | | |
|---|---|---|---|
| 2,454,545 | 9/1948 | Bock et al. | 260/29.2 |
| 3,265,641 | 8/1966 | Wismer et al. | 260/2.5 |
| 4,031,050 | 6/1977 | Jerabek | 523/415 |
| 5,276,072 | 1/1994 | Ishii et al. | 523/415 |
| 5,491,183 | 2/1996 | Yamada et al. | 523/404 |

*Primary Examiner*—Frederick Krass
*Attorney, Agent, or Firm*—Millen, White, Zelano, & Branigan, P.C.

[57] ABSTRACT

A cathodic electrodeposition paint containing a cationically modified epoxy resin and a crosslinker dispersed in an acidic aqueous medium is disclosed. The paint contains as an auxiliary component for improving the surface smoothness of the cured paint films a t-alkylphenol novolac resin-alkylene oxide adduct or a reaction product thereof with a half blocked diisocyanate.

17 Claims, No Drawings

CATHODIC ELECTRODEPOSITION PAINT FORMING FILMS HAVING IMPROVED SURFACE SMOOTHNESS

BACKGROUND OF THE INVENTION

This invention relates to a cathodic electrodeposition paint which forms films having improved surface smoothness.

Amine-modified epoxy resins used as a film-forming cationic resin in cathodic electrodeposition paints are known in the art, for example, in JP-A-54004978 and JP-A-56034186. These amine-modified epoxy resins are produced by reacting a bisphenol type epoxy resin with a primary or secondary amine to open all epoxy rings with the amine, or by reacting the epoxy resin first with a hydroxyl or carboxyl group-containing compound such as monophenols, monocarboxylic acids, hydroxycarboxylic acids, polycaprolactone diols or polyether diols to open a portion of epoxy rings and then with a primary or secondary amine to open the remaining epoxy rings. The resultant amine-modified epoxy resins are dispersed in an aqueous medium containing a neutralizing acid together with a crosslinker such as blocked polyisocyanates or melamine resin. Self-crosslinkable, amine-modified epoxy resins may be produced by reacting a bisphenol type epoxy resin with a half blocked diisocyanate to bind the diisocyanate through a secondary alcoholic group present in the resin molecule and then with a primary or secondary amine to open all terminal epoxy rings.

Cathodic electrodeposition paints derived from the above amine-modified epoxy resins have a defect, i.e., their wet films are susceptible to tiny craters induced by oil droplets or other particulate matters during the baking step resulting in cured films with impaired surface smoothness. Several methods are known to solve this problem including the addition of silicone anti-repellents or adducts of epoxy resin and polyoxypropylene diamine to the paint formulation. These additives, however, tend to decrease the adhesion of the paint film to a middle or top coating layer directly applied thereon.

U.S. Pat. No. 5,491,183 assigned to the assignee of this application discloses an auxiliary resin for improving the surface smoothness of the cured films of a cathodic electrodeposition paint when added thereto. The auxiliary resin is a reaction product produced by reacting a t-alkylphenol novolac epoxy resin with an amount of an active hydrogen compound capable of introducing a cationic group to open all epoxy rings. When the thus produced auxiliary resin has a hydroxyl group, reaction thereof with a lactone or alkylene oxide, to graft a soft segment to the auxiliary resin improves not only the surface smoothness but also the impact strength of the paint film. The auxiliary resin components of these types commonly start from a t-alkylphenol novolac epoxy resin.

SUMMARY OF THE INVENTION

We have now found that an additive or auxiliary resin for improving the surface smoothness of the cured paint films of a cathodic electrodeposition paint which is as effective as the auxiliary resins disclosed in the above-cited U.S. patent may be provided starting from a non-epoxidized t-alkylphenol novolac resin.

The present invention provides a cathodic electrodeposition paint composition comprising a primary cationically modified epoxy resin and a crosslinker dispersed in an aqueous medium containing a neutralizing acid. According to the present invention, the paint composition additionally comprises a cured film surface smoothness improving amount of a polyether polyol produced by addition reacting an alkylene oxide with a t-alkylphenol novolac resin, or a reaction product of said polyether polyol with a half blocked diisocyanate.

Not only do the above polyether polyol and a reaction product thereof with a half blocked diisocyanate improve the surface smoothness of the paint films, but they also act as a defoaming agent in the liquid paint composition.

DETAILED DESCRIPTION OF THE INVENTION

Auxiliary Resin

Novolac resins are, as is well-known, an acid catalyzed polycondensation product of a phenol and formaldehyde. The starting novolac resins used in the present invention are derived from a phenol having a t-alkyl group such as t-butyl, t-amyl or t-octyl normally at the para position. They may be represented by the following formula:

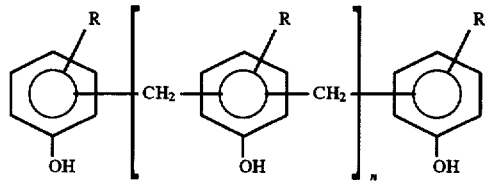

wherein R is a t-alkyl, and n is from 1 to 6 in average.

It is also well-known that polyether polyols are produced by addition polymerizing an alkylene oxide using an initiator having an active hydrogen atom-containing group such as hydroxyl group. The initiator of polyether polyols used for, e.g., the production of polyurethanes is an aliphatic polyhydric alcohol such as ethylene glycol, propylene glycol or trimethylolpropane. For the purpose of the present invention, the above t-alkylphenol novolac resin is employed as the initiator and an alkylene oxide, preferably ethylene oxide, propylene oxide or both are addition polymerized to each hydroxyl group of the initiator resin. For the purpose of the present invention, novolac resins of the above formula wherein n is from 1 to 6, in average, namely those of 3 to 8 nuclei in average are preferable. Preferably 2 to 10 moles in average of ethylene oxide, propylene oxide or both are added to each hydroxyl group. When both ethylene oxide and propylene oxide are addition polymerized, the polymer chain may be either a random or block copolymer chain. The addition polymerization reaction is performed, as is well-known, in the presence of an alkaline catalyst such as potassium hydroxide. Because the addition polymerization reaction of an alkylene oxide is well-known in the art, further details thereof will not be necessary for understanding the present invention.

Some of the above-mentioned preferred t-alkylphenol novolac resin-alkylene oxide adducts are commercially available in the market. For example, a variety of polyether polyols derived from a t-butylphenol novolac resin having an average number of nuclei of 4.2 and propylene oxide or ethylene oxide are available from Sanyo Chemical Industries, Ltd., Kyoto, Japan under the trade name of PNP-3, PNP-5, PNP-8, PNP-10, PNE-5 etc. In these names, PNP designates the adduct of propylene oxide and PNE designates the adduct of ethylene oxide. The numeral designates an average number of moles of alkylene oxide added to each hydroxyl group.

These t-alkylphenol novolac resin-alkylene oxide adducts themselves improve the surface smoothness of the cured paint films of a cathodic electrodeposition paint without adversely affecting other properties of the paint films. They also act as a defoaming agent in the electrodeposition paint bath because they have a chemical structure similar to conventional nonionic surfactants.

According to another aspect of the present invention, the above t-alkylphenol novolac resin-alkylene adduct may be modified to have a blocked isocyanate moiety. To this end, a half blocked diisocyanate is reacted with the terminal hydroxyl group present in the polyoxyalkylene chain of the polyether polyol to bind it through a urethane linkage. The introduction of the blocked isocyanate moiety to the polyether polyol renders the auxiliary resin crosslinkable while both of the ability of improving the surface smoothness of the paint films and the defoaming property are preserved. Thus the crosslinkable auxiliary resin of this type serves as a crosslinker of the primary resin.

Half blocked diisocyanate compounds are well-known in the electrodeposition paint technology. Conventionally they have been used in the production of self-crosslinkable, amine-modified epoxy resins or pigment dispersant resins. Half blocked polyisocyanate compounds are produced by blocking one of isocyanato groups with a blocking agent.

Examples of starting diisocyante compounds include tolylenediisocyanate (TDI), xylylenediisocyanate, phenylenediisocyanate, diphenylmethanediisocyanate (MDI), bis-(isocyanatomethyl)cyclohexane, tetramethylenediisocyanate, hexamethylenediisocyanate (HMDI), isophoronediisocyanate (IPDI), hydrogenated MDI, and norbonadienediisocyanate.

A variety of blocking agents are known in the art to block a free isocyanate group so that the blocked product is inert and stable at room temperature but capable of regenerating free isocyanate function by thermal dissociation of the blocking agent upon heating to a temperature above the dissociation point. Examples of blocking agents include phenols such as phenol, cresol, xylenol, chlorophenol or ethylphenol; lactams such as ε-caprolactam, δ-valerolactam, γ-butyrolactam, or β-propiolactam; activated methylene compounds such as ethyl acetoacetate or acetylacetone; alcohols such as methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate or ethyl lactate; oximes such as formaldoxime, acetaldoxime, acetoxime, methyl ethyl ketoxime, diacetyl monooxime or cyclohexanoxime; mercaptans such as butylmercaptan, hexylmercaptan, t-butylmercaptan, thiophenol, methylthiophenol or ethylthiophenol; amides such as acetamide or benzamide; imides such as succinimide or maleimide; amines such as xylidine, aniline, butylamine or dibutylamine; imidazoles such as imidazole or 2-ethylimidazole; and imines such as ethyleneimine or propyleneimine. Oximes such as methyl ethyl ketoxime are used to advantage.

Not all of alcoholic hydroxyl groups of the t-alkylphenol novolac resin/alkylene oxide adduct need be reacted with the half blocked diisocyanate compound. In other words, the equivalent ratio of OH/free NCO may be 1 or less, preferably from 0.1 to 1. The reaction between the polyether polyol derived from t-alkylphenol novolac resin and the half blocked diisocyanate compound is performed by the conventional method in the presence of a catalyst such as dibutyltin oxide until no free isocyanate function is detected in the reaction mixture while taking care to the exothermic nature of this reaction.

Primary Cationic Resin

The primary cationic resin used in the electro-deposition paint of the present invention may be any of known amine-modified epoxy resins such as those disclosed in JP-A-54004978 and JP-A-56034186 cited supra. Typically, they may be produced by reacting a bisphenol type epoxy resin with a cationic active hydrogen compound alone or in combination with a non-cationic active hydrogen compound to open all epoxy rings with the active hydrogen compound. Examples of bisphenol type epoxy resins include bisphenol A epoxy resins such as EPIKOTE 828 having an epoxy equivalent weight of 180–190, EPIKOTE 1001 having an epoxy equivalent weight of 450–500, and EPIKOTE 1010 having an epoxy equivalent weight of 3,000–4,000; and bisphenol F epoxy resins such as EPIKOTE 807 having an epoxy equivalent weight of 170. These resins are available from Yuka Shell Epoxy Co., Ltd. Oxazolidone ring-containing epoxy resins may also be used as the starting epoxy resin as disclosed in commonly assigned U.S. Pat. No. 5,276,072. These epoxy resins are preferably modifed with an active hydrogen compound to have an amine or cation equivalent from 0.3 to 4.0 meq/g.

Active hydrogen compounds for introducing a cationic group are a primary or secondary amine, a tertiary amine acid addition salt, or a sulfide-acid mixture. Examples thereof include butylamine, octylamine, diethylamine, dibutylamine, methylbutylamine, monoethanolamine, diethanolamine, N-methylethanolamine, triethylamine hydrochloride, N,N-dimethylethanolamine acetate, diethyldisulfide-acetic acid mixture, and secondary amines having a ketiminized primary amino group such as aminoethylethanolamine ketimine or diethylenetriamine diketimine. A mixture of amines may also be used. Examples of non-cationic active hydrogen compounds include monophenols such as phenol, cresol, nonylphenol or nitrophenol; monoalcohols such as hexyl alcohol, 2-ethylhexanol, stearyl alcohol, monobutyl- or monohexyl ether of ethylene glycol or propylene glycol; aliphatic monocarboxylic acids such as acetic or stearic acid; aliphatic hydroxycarboxylic acids such as glycolic, dimethylolpropionic, hydroxypivalic, lactic or citric acid; and mercaptoalkanols such as mercaptoethanol.

Crosslinker

Although melamine resins may be used for crosslinking the primary cationic resin, blocked polyisocyanate compounds are preferred as crosslinker. Blocked polyisocyanate compounds are produced by reacting an organic polyisocyanate with a stoichiometric amount of a blocking agent. Examples of organic polyisocyanates include aromatic, alicyclic or aliphatic polyisocyanates such as tolylenediisocyanate, xylylenediisocyanate, phenylenediisocyanate, diphenylmethanediisocyanate, bis(isocyanatomethyl)cyclohexane, tetramethylenediisocyanate, hexamethylenediisocyanate, isophoronediisocyanate, dimers or trimers of these diisocyanates, and isocyanate group-terminated urethane prepolymers produced by reacting an excess of an organic polyisocyanate compound with a low molecular weight polyfunctional active hydrogen compound such as ethylene glycol, propylene glycol, trimethylolpropane, hexanetriol or castor oil.

The blocking agent should be capable of reversibly blocking the free isocyanate group so that the blocked polyisocyanate is stable and inert at ambient temperature but the free isocyanate function may be regenerated by the dissociation of the blocking agent when heating to a temperature above the dissociation temperature. Examples of usable blocking agents have been given previously in connection with the production of half blocked diisocyanate.

Self-crosslinkable modified epoxy resins may be used wholly or partly as the primary resin and the crosslinker. The self-crosslinkable resin may be produced by reacting a bisphenol type epoxy resin first with a half blocked diisocyanate to bind the diisocyanate through a urethane linkage between a secondary alcoholic group present in the resin molecule and the free isocyanate group of half blocked diisocyanate, and then with a cationic active hydrogen compound to open all epoxy rings in the same manner as the primary cationic resin.

Electrodeposition Paint

The electrodeposition paint of the present invention may be prepared by dispersing the primary and auxiliary resins and the crosslinker in an aqueous medium containing a neutralizing acid. The auxiliary resin may be dispersed in the aqueous medium together with the primary resin and the crosslinker. Alternatively, an aqueous dispersion of the auxiliary resin may be blended to a dispersion of the primary resin and the crosslinker prepared separately. Examples of neutralizing acids include hydrochloric, nitric, phosphoric, formic, acetic and lactic acids.

The amount of crosslinker must be sufficient to give a rigid film through a crosslinking reaction with amino, hydroxyl or carboxyl group contained in the primary and auxiliary resins, and generally ranges from 5 to 50% by weight of the resins as solids. The amount of neutralizing acid is such that at least 20%, preferably 30 to 60% neutralization of the resins is achieved. The amount of auxiliary resin ranges from 0.05 to 30%, preferably from 0.5 to 20% by the combined weight of the primary resin and the crosslinker as solids. Paints containing blocked polyisocyanate crosslinker may contain from 0.1 to 5% by weight of the crosslinker of a catalyst such as dibutyltin dilaurate, dibutyltin oxide or other urethane-cleaving catalysts.

The paint formulation may contain a variety of conventional additives. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like.

The following examples are intended to illustrate the invention without limiting thereto. All parts and percents therein are by weight unless otherwise indicated.

PRODUCTION EXAMPLE 1

A flask equipped with a stirrer, condenser, nitrogen gas tube, thermometer and drip funnel was charged with 79.3 parts of methyl isobutyl ketone (MIBK), 222 parts of isophoronediisocyante (IPDI) and 0.2 parts of dibutyltin dilaurate (DBTL). The content of the flask was heated to 50° C. to make a homogenous solution. Then 95.7 parts of methyl ethyl ketoxime (MEKO) were added dropwise from the drip funnel over 1 hour. Thereafter the temperature was raised to 80° C. with a caution to the exothermic reaction. MEKO half blocked IPDI having an NCO equivalent weight of 350 and a nonvolatile content of 80% was obtained.

PRODUCTION EXAMPLE 2

A flask as used in Production Example 1 was charged with 65.9 parts of MIBK, 168 parts of hexamethylenediisocyanate (HMDI) and 0.2 parts of DBTL. The content was heated to 50° C. to make a homogenous solution. Then 95.7 parts of MEKO were added dropwise from the drip funnel over 1 hour. Then the temperature was raised to 80° C. with a caution to the exothermic reaction. MEKO half blocked HMDI having an NCO equivalent weight of 300 and a nonvolatile content of 80% was obtained.

EXAMPLE 1

A flask equipped with a stirrer, condenser, nitrogen gas tube, thermometer and drip funnel was charged with 415 parts of t-butylphenol novolac resin-propylene oxide adduct (PNP-5 sold by Sanyo Chemical Industries, Ltd., average nuclei number=4.2, average moles of propylene oxide per OH group=5, OH number=135), 104 parts of MIBK and 0.2 parts of DBTL. To this were added dropwise 220 parts (OH/NCO equivalent ratio=0.5) of MEKO half blocked IPDI of Production Example 1. Then the mixture was allowed to react at 70° C. with a caution to the exothermic reaction until the presence of NCO group was not detected. Auxiliary Resin A of 80% nonvolatiles was obtained.

EXAMPLE 2

A flask as used in Example 1 was charged with 415 parts of PNP-5, 104 parts of MIBK and 0.6 parts of DBTL. To this were added 440 parts (OH/NCO equivalent ratio=1.0) of MEKO half blocked IPDI of Production Example 1. Then the mixture was allowed to react at 70° C. with a caution to the exothermic reaction until the presence of NCO group was not detected. Auxiliary Resin B of 80% nonvolatiles was obtained.

EXAMPLE 3

A flask as used in Example 1 was charged with 415 parts of PNP-5, 104 parts of MIBK and 0.6 parts of DBTL. To this were added 366 parts (OH/NCO equivalent ratio=1.0) of MEKO half blocked HMDI of Production Example 2. Then the mixture was allowed to react at 70° C. with a caution to the exothermic reaction until the presence of NCO group was not detected. Auxiliary Resin C of 80% nonvolatiles was obtained.

EXAMPLE 4

Example 3 was followed except that 300 parts of t-butylphenol novolac resin-ethylene oxide adduct (PNE-5 sold by Sanyo Chemical Industries, Ltd., average nuclei number=4.2, average moles of ethylene oxide per OH group=5) were replaced for 415 parts of PNP-5. Auxiliary Resin D of 80% nonvolatiles was obtained.

PRODUCTION EXAMPLE 3

Primary Resin

A flask equipped with a stirrer, condenser, nitrogen gas tube, thermometer and drip funnel was charged with 54 parts of tolylenediisocyanate (80:20 mixture of 2,4- and 2,6- isomers), 136 parts of MIBK and 0.5 parts dibutyltin dilaurate. To this were added dropwise 11 parts of methanol with stirring over 30 minutes. The inner temperature reached at 60° C. during this period. After continuing the reaction for additional 30 minutes, 54 parts of ethylene glycol mono-2-ethylhexyl ether were added dropwise over 1 hour. The reaction was further continued while keeping the inner temperature at 60°–65° C. until the absorption of isocyanato group disappeared in IR spectrometry. Thereafter 285 parts of a bisphenol F epoxy resin having an epoxy equivalent wt. of 475, 380 parts of a bisphenol F epoxy resin having an epoxy equivalent wt. of 950, and 0.62 parts of benzyldimethylamine were added to the flask. The mixture was then heated to 120° C. and allowed to react while distilling off methanol produced as a by-product until an epoxy equivalent wt. of 1120 was reached. After cooling, 29 parts of diethanolamine, 22 parts of N-methylethanolamine and 33 parts of aminoethylethanolamine ketimine (79% solution in MIBK) were added. The mixture was then allowed to react at 110° C. for 2 hours and diluted with MIBK to 80% nonvolatiles.

PRODUCTION EXAMPLE 4

Crosslinker

A flask as used in Production Example 3 was charged with 199 parts of hexamethylenediisocyanate trimer (CORONATE HX, Nippon Polyurathane K.K.), 32 parts of MIBK and 0.1 parts of dibutyltin dilaurate. To this were added dropwise 87.0 parts of methyl ethyl ketoxime over 1 hour with stirring and nitrogen gas bubbling while keeping the inner temperature at 50° C. Thereafter the mixture was allowed to react at 70° C. until no absorption of isocyanato group was detected in the IR spectrometry.

PRODUCTION EXAMPLE 5

Pigment Paste

A pigment paste was prepared by milling the following mixture in a sand grind mill to a particle size less than 10 microns.

| Ingredients | Parts |
| --- | --- |
| Pigment dispersing resin (product of Nippon Paint Co., Ltd., sulfonium type modified epoxy resin, 75% solids) | 125.0 |
| Carbon black | 8.5 |
| Kaolin | 72.0 |
| Titanium dioxide | 345.0 |
| Aluminum phosphomolybdate | 75.0 |
| Deionized water | 400.0 |

EXAMPLES 5–14

Electrodeposition Paint

The primary resin of Production Example 3, one of auxiliary resins of Examples 1–4, and the crosslinker of Production Example 4 were blended in proportions as solids shown in Table 1, and ethylene glycol mono-2-ethylhexyl ether was added in a proportion of 2% of total solids of the mixture. Then the mixture was mixed with an amount of glacial acetic acid to achieve 42.5% neutralization and then gradually diluted with deionized water to 36.0% solids while distilling off MIBK under vacuum.

2,000 parts of the resulting emulsion were mixed with 460 parts of pigment paste of Production Example 5 and then diluted with deionized water to 20% solids.

Paint films were prepared by applying electrically on a zinc phosphate-treated cold rolled steel plate to a dry film thickness of 20 microns, and baked at 160° C. for 10 minutes. The results of evaluation on the paint film are also shown in Table 1.

TABLE 1

| | Example | | | | | |
| --- | --- | --- | --- | --- | --- | --- |
| | 5 | 6 | 7 | 8 | 9 | 10 |
| Primary Resin (parts as solids) | 70 | 70 | 70 | 70 | 70 | 70 |
| Auxiliary resin (parts as solids) | PNP-3[1]) 5 | PNP-5[1]) 5 | PNP-8[1]) 5 | PNP-10[1]) 5 | A 5 | B 5 |
| Crosslinker (parts as solids) | 30 | 30 | 30 | 30 | 30 | 30 |
| Spontaneous cratering[2]) | Good | Good | Good | Good | Good | Good |
| Oil cratering[3]) | Good | Good | Good | Good | Good | Good |
| Defoaming[4]) | Good | Good | Good | Good | Good | Good |
| Overcoating adhesion[5]) | Good | Good | Good | Good | Excellent | Excellent |

| | EXAMPLE | | | | COMPARATIVE EXAMPLE |
| --- | --- | --- | --- | --- | --- |
| | 11 | 12 | 13 | 14 | |
| Primary Resin (parts as solids) | 70 | 70 | 70 | 70 | 70 |
| Auxiliary resin (parts as solids) | C 3 | C 5 | C 15 | D 5 | Not added |
| Crosslinker (parts as solids) | 30 | 30 | 30 | 30 | 30 |
| Spontaneous cratering[2]) | Good | Good | Good | Good | Bad |
| Oil cratering[3]) | Good | Good | Good | Good | Bad |
| Defoaming[4]) | Good | Good | Good | Good | Bad |
| Overcoating adhesion[5]) | Excellent | Excellent | Excellent | Excellent | Excellent |

Remarks:

1) PNP series:
t-butylphenol novolac resin (average number of nuclei= 4.2)-propylene oxide adduct sold by Sanyo Chemical Industries, Ltd. The numeral represents average moles of proplene oxide per hydroxyl group.

2) Spontaneous cratering:
The numer of spontaneous craters in 50 $cm^2$ area was visually counted.
Good: none; Fair: 1–10 ; Bad: >10

3) Oil cratering:
30 ppm of a mineral oil (press-cleaning oil, solubility parameter=9.0) was dispersed in the paint. This paint was applied electrically on a cold rolled steel plate of 70×150 cm size to a dry film thickness of 20 μm, and baked at 180° C. for 20 minutes. The number of craters in the whole area was visually counted.
Good: 0–2 ; Fair: 3–10 ; Bad: >10

4) Defoaming:
A 100 ml aliquot of paint was poured into a 500 ml graduated cylinder from a Ford cup placed to 100 cm height and the volume of foam was measured.
Good: 0–20 ml ; Fair: 20–50 ml ; Bad: >50 ml 5) Overcoating adhesion:
The electrodeposition paint film was overlaid with an alkyd overcoating paint by spraying the alkyd paint to a dry film thickness of 35 microns and baking at 140° C. for 30 minutes. Then the overcoating film was scratched, according to JIS K5400-1975 6.15. into 100 grid segments each being of size 1 mm×1 mm. Then a pressure sensitive adhesive tape was applied on the grid and stripped off rapidly. The evaluation was made by counting the number of grid segments which remained on the electrodeposition paint film.

Excellent: 100/100; Good: 90–99/100;
Bad: <90/100

We claim:

1. In a cathodic electrodeposition paint composition comprising a cationically modified epoxy resin and a crosslinker dispersed in an aqueous medium containing a neutralizing acid, the improvement wherein said paint composition comprises a cured film surface smoothness improving amount of the addition polymerization product of a t-alkyphenol novolac resin having an average number of nuclei from 3 to 8 with from 2 to 10 moles per phenolic hydroxyl group of ethylene oxide, propylene oxide or a mixture thereof, or a reaction product thereof with a half blocked diisocyanate.

2. The cationic electrodeposition paint composition according to claim 1, wherein the proportion of said addition polymerization product or said reaction product is from 0.05 to 30% of the combined weight of said cationically modified epoxy resin and said crosslinker.

3. The cathodic electrodeposition paint composition according to claim 1, wherein said t-alkylphenol is t-butylphenol, t-amylphenol, t-octylphenol or a mixture thereof.

4. The cathodic electrodeposition paint composition according to claim 1, wherein said reaction product is produced by reacting said addition polymerization product and said half blocked isocyanate at an OH/NCO equivalent ratio from 0.1 to 1.0.

5. The cathodic electrodeposition paint composition according to claim 1, wherein said epoxy resin is a bisphenol epoxy resin.

6. The cathodic electrodeposition paint composition according to claim 1, wherein said epoxy resin is an oxazolidone ring-containing epoxy resin.

7. The cathodic electrodeposition paint composition according to claim 1, wherein said crosslinker is a blocked polyisocyanate.

8. A method of improving the surface smoothness of cured films of a cathodic electrodeposition paint comprising:

forming on a conductive substrate an electrically deposited film containing a cationically modified epoxy binder resin, a crosslinker and a cured film smoothness improving amount of the addition polymerization product of a t-alkyphenol novolac resin having an average number of nuclei from 3 to 8 with from 2 to 10 moles per phenolic hydroxyl group of ethylene oxide, propylene oxide or a mixture thereof, or a reaction product of said addition polymerization product with a half blocked diisocyanate, and baking said electrically deposited film at an elevated temperature.

9. The method of claim 8, wherein said cured film smoothness improving amount of the addition polymerization product or reaction product thereof with a half-block diisocyanate ranges from 0.05 to 50% by the combined weight of said binder resin and said crosslinker as solids.

10. The method of claim 9, wherein said t-alkylphenol is t-butylphenol, t-amylphenol, t-octylphenol or a mixture thereof.

11. The method of claim 9, wherein said reaction product is produced by reacting said addition polymerization product and said half blocked diisocyanate at an OH/NCO equivalent ratio from 0.1 to 1.0.

12. The method of claim 9, wherein said cationically modified epoxy resin is derived from a bisphenol epoxy resin.

13. The method of claim 9, wherein said cationically modified epoxy resin is derived from an oxazolidone ring-containing epoxy resin.

14. The method of claim 9, wherein said crosslinker is a blocked polyisocyanate.

15. A cathodic electrodeposition paint composition comprising:

a cationically modified epoxy resin, a crosslinker dispersed in an aqueous medium containing a neutralizing acid and an auxiliary resin effective for improving the cured film surface smoothness of the paint composition which is a polyether polyol of a t-alkylphenol novolac resin, having an average number of nuclei of 3 to 8, and an alkylene oxide, wherein from 2 to 10 moles on average of said alkylene oxide are added to each hydroxyl group of the t-alkylphenol novolac resin, or which is a reaction product of said polyether polyol with a half blocked diisocyanate.

16. The paint composition of claim 15 wherein the t-alkylphenol novolac resin is non-epoxidized.

17. The paint composition of claim 15, wherein the alkylene oxide is ethylene oxide, propylene oxide or a mixture thereof.

* * * * *